March 13, 1962 J. S. MALSBARY 3,025,454
VOLTAGE CONTROL DEVICE
Filed July 28, 1960 2 Sheets-Sheet 1
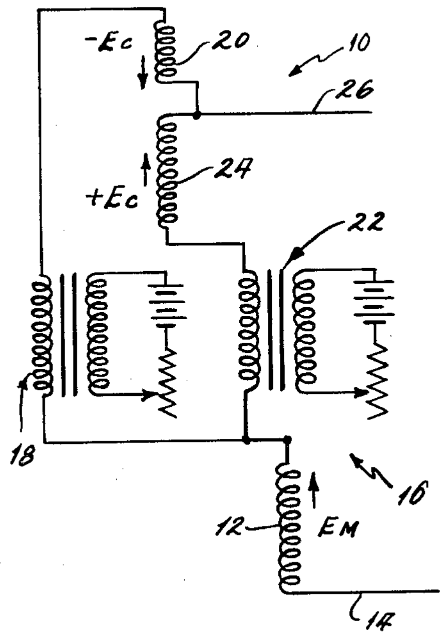
FIG.1
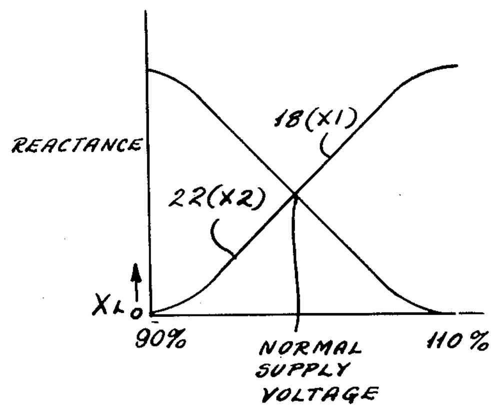
FIG.2
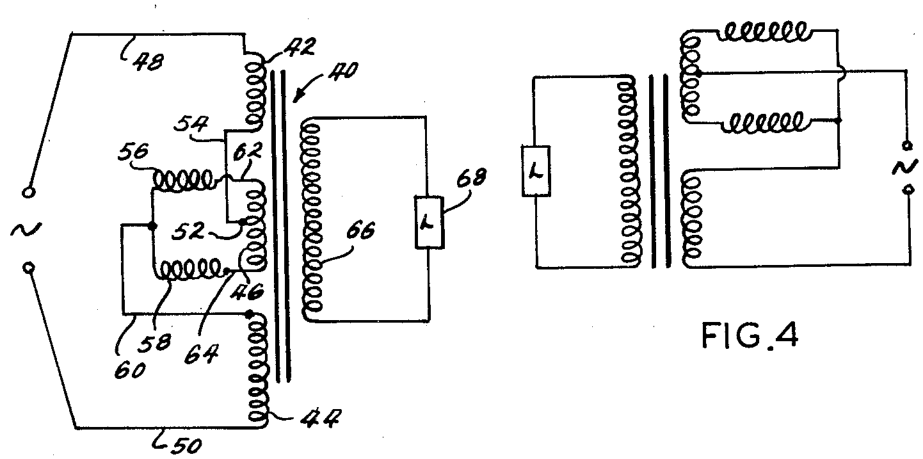
FIG.3
FIG.4
INVENTOR:
JAMES S. MALSBARY
BY Gravely, Lieder & Woodruff
ATTORNEYS.

INVENTOR:
JAMES S. MALSBARY
BY Gravely, Lieder & Woodruff
ATTORNEYS.

3,025,454

VOLTAGE CONTROL DEVICE

James S. Malsbary, Glendale, Mo., assignor to Wagner Electric Corporation, St. Louis, Mo., a corporation of Delaware Filed July 28, 1960, Ser. No. 45,939
10 Claims. (Cl. 323—61)

The present invention relates to voltage control devices in general and more particularly to a voltage regulator for a supply system.

Various devices have been devised and used in the past for regulating voltages of electrical supply systems and particularly alternating current supply systems. The known devices, however, are relatively expensive to make and operate, and in most cases have numerous movable parts such as switches and other components which are subject to wear and arcing. These and other disadvantages of the known devices are in large measure overcome by the present invention which teaches the construction and use of a relatively inexpensive, yet versatile, control device having a minimum number of movable parts, and which is not as subject to wear and arcing as the known devices.

Therefore, it is a principal object of the present invention to provide relatively inexpensive means for controlling and regulating voltage.

Another object is to reduce the number of movable parts in a voltage control device.

Another object is to reduce maintenance and repair costs of voltage control devices.

Another object is to provide a voltage control device that can be connected in either the input or load circuits of a supply system.

Another object is to provide voltage control means that do not interrupt the flow of power in the system controlled.

Another object is to provide smooth as distinguished from incremental voltage regulation.

Another object is to improve the accuracy of voltage control devices over the range thereof.

Still another object is to provide extremely fast acting voltage control means.

These and other objects and advantages of the present invention will become apparent after considering the following specification covering several preferred embodiments of the invention in conjunction with the accompanying drawings.

In the drawings:

FIG. 1 is a schematic wiring diagram of a system provided with a form of the subject voltage control device;

FIG. 2 is a graph of reactances of the reactors in the system of FIG. 1 plotted as a function of supply voltage;

FIG. 3 is a schematic wiring diagram showing a modified form of the control device of FIG. 1; and FIGS. 4–7 are schematic wiring diagrams showing other modified forms of the same or similar control devices.

Figure 5:
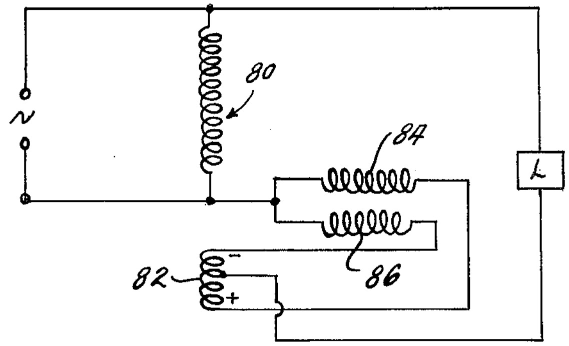

Referring to the drawings by reference numbers, the number 10 in FIG. 1 refers to a supply system which has its voltage controlled by a device or circuit constructed according to the present invention. The supply system 10 has a main winding 12 which can be the primary or secondary winding of a transformer or a winding of any other alternating current supply system. One end of the winding 12 is connected to a lead 14 which is connected to a source of energy or to a load, and the other end of the winding 12 is connected to a control circuit designated generally by number 16. The control circuit 16 has two branches, one of which comprises a series connected reactor 18 and a corrector winding 20; and the other a series connected reactor 22 and another corrector winding 24. A common connection between the windings 20 and 24 is connected to another line or load lead 26.

The saturable reactors 18 and 22 have alternating current windings connected in series with the winding 20 and 24 respectively, and they also have direct current control windings (FIG. 1) which are variable by means of control circuits including resistors and batteries for changing the reactance of the alternating current windings. Any known means including those shown in FIG. 1 can be used for this purpose and it is contemplated that some such means be provided for the reactors shown in all of the drawing figures.

For illustrative purposes the corrector winding 20 is shown connected in phase opposition to the main winding 12. This is represented by the symbol $-E_C$ and the downwardly pointing arrow. The corrector winding 24 on the other hand is connected in phase with the main winding 12 as represented by the symbol $+E_C$ and an arrow pointing up. Windings 20 and 24 in an actual device are usually wound in phase with 12 on the same core (not shown) but due to the connections, the voltage of winding 20 opposes voltage of winding 12 while the voltage of winding 24 aids the voltage of winding 12.

By adjusting the reactances or impedances of the reactors 18 and 22 using the associated control circuits, the current flow through the associated series connected corrector windings 20 and 24 are adjusted, and the voltage across the leads 14 and 26 is regulated or maintained at a desired value assuming windings 12, 20 and 24 are secondary windings. For example, if the impedance of the reactor 18 is adjusted to be very high and the impedance of the reactor 22 very low, approaching a short circuit, then practically all of the current in the circuit will flow through the windings 12 and 24 and little, if any, will flow through the winding 20. Therefore, since the windings 12 and 24 are connected to have the same phase, the voltage across the leads 14 and 26 will be approximately equal to the sum of the voltages across the windings 12 and 24. If the windings 12, 20 and 24 are the primary windings of a transformer, then the transformer primary will have effective turns equal to the sum of the turns of windings 12 and 24.

If, however, the reverse is true and the reactor 22 is adjusted to have a very high impedance and the reactor 18 to have very low impedance, then winding 20 instead of 24 will be the effective corrector winding in series with the winding 12. However, since the winding 20 is connected to be out-of-phase with the main winding 12, the effect is to reduce the number of primary (or secondary) windings of the transformer to an amount equal to the difference between the turns of the windings 12 and 20.

Adjustment of the impedance of reactors 18 and 22 can also be made to satisfy any condition between the two extremes described above in order to compensate for voltage variations in the supply or load circuits on either side of normal, normal being the condition of the circuit in which the effect of the windings 20 and 24 are equal and therefore cancel. This occurs when the two reactors 18 and 22 have the same impedances and the windings 20 and 24 have the same number of turns but are of opposite phase.

FIG. 2 shows in graphical form how the impedance of the reactors 18 and 22 are adjusted to compensate for changes or variations in the supply voltage (or load voltage) to regulate the output. The point on the graph where the impedances of both reactors 18 and 22 are the same represents normal circuit condition as described above.

FIG. 3 shows a modified form of the present control device connected to operate with the primary side of transformer 40. The transformer 40 has two main primary windings 42 and 44 and a primary corrector winding 46.

One side of main primary winding 42 is connected to a source of voltage by lead 48, and one side of the winding 44 is connected to the other side of the source by lead 50. The opposite side of the winding 42 is connected to an intermediate tap 52 on the corrector winding 46 by lead 54, and the corresponding opposite side of the winding 44 is connected to one side of two reactor elements 56 and 58 by lead 60. The other sides of the reactors 56 and 58 are connected respectively to opposite ends of the corrector winding 46 by leads 62 and 64. The transformer 40 also has a secondary winding 66 which is connected across a load 68. The reactors 56 and 58 like the reactors of FIG. 1 are variable impedance devices and have alternating current windings connected as described above, and direct current control means for varying the impedances thereof (not shown).

The operation of the device of FIG. 3 is similar to that for the device of FIG. 1, but instead of having separate aiding and bucking corrector windings as in the device of FIG. 1, the single corrector winding 46 of FIG. 3 accomplishes voltage regulation by changing the direction of the current flow in different portions thereof. For example, if the reactor 56 has a high impedance and the reactor 58 has a low impedance, substantially all of the primary current will pass through the lower portion of the corrector winding 46 in the same direction as it passes through the main windings 42 and 44. Therefore, the number of effective primary turns will equal the sum of the turns of the main windings plus the effective turns of the corrector winding.

If, on the other hand, the reactor 58 has a high impedance and the reactor 56 a low impedance, then substantially all of the primary current will pass downwardly through the upper portion of the corrector winding 46, in a direction opposite to the direction in which current passes through the windings 42 and 44. In this situation the effective primary turns will equal the difference between the combined turns of the windings 42 and 44 and the effective turns of the corrector winding.

FIGS. 4–7 show other forms of the device all of which employ two variable reactor elements and a corrector winding in conjunction with a winding of an alternating current supply system.

The device of FIG. 4 is similar in construction and operation to the devices of FIGS. 1 and 3 and no further description is deemed necessary.

FIG. 5 shows a similar device employed in conjunction with an autotransformer 80. Here also a corrector winding 82 and two variable reactors 84 and 86 are provided for changing the number of effective transformer turns by adding or subtracting turns to the main winding. The way in which this is done is similar to that described above.

Figure 6:
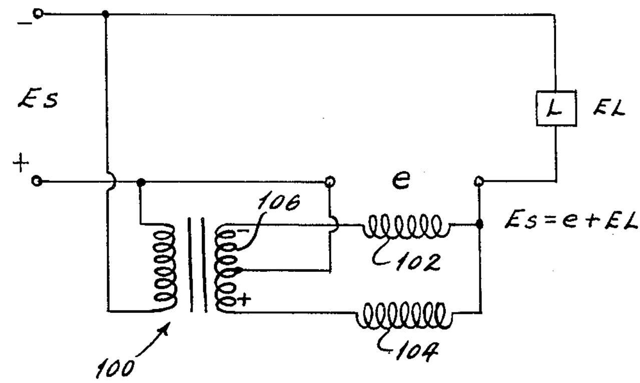

In FIG. 6 is shown another circuit wherein the control is connected in the output or load circuit. This construction employs the same basic kind of control described above in conjunction with the load circuit except that a transformer 100 is used to feed the control circuit, and the output of the control circuit is connected in series with the load. In this circuit the transformer is employed as part of the control and not as part of the main supply system. Operation of the device of FIG. 6 is again obtained by varying the impedances of two reactors 102 and 104 which are associated with different portions of the transformer secondary or corrector winding 106. For example, with the particular phase relationship between the supply voltage $E_s$ and the voltage of the corrector winding 106, as indicated by the instantaneous polarity signs, reducing the impedance of reactor 102 to a minimum value while increasing the impedance of reactor 104 to a relatively high value will effectively place the upper portion of the corrector winding in series opposing relation with the supply source. The load voltage $E_L$ will be substantially equal to the difference between the supply voltage and the voltage across the upper portion of the corrector winding. If the impedance of reactor 104 is reduced to a minimum and that of reactor 102 increased to a relatively high value, the load voltage will be substantially equal to the sum of the supply voltage and the voltage across the lower portion of the corrector winding 106. The voltage across the lower portion of the corrector winding 106 is in phase with the supply voltage. By changing the relative impedance values of the two reactors, various values of corrector winding voltage, either opposing or aiding the supply voltage, will be combined with the supply voltage $E_s$.

Figure 7:
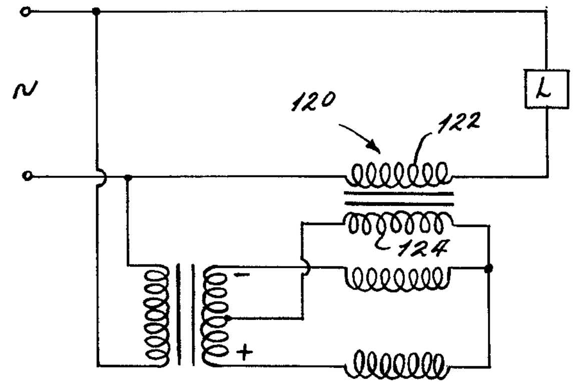

The construction shown in FIG. 7 is similar to the construction shown in FIG. 6 except that it employs a coupling transformer 120 which has a secondary winding 122 connected in series with the load and a primary winding 124 connected across the output of the control circuit. While the desired values of corrector winding voltage are introduced into the load circuit by direct connection in FIG. 6, the circuit of FIG. 7 employs the coupling transformer 120 having any desired turns ratio. For example, the transformer 120 may be used to boost the voltage available from the corrector winding where desired. The transformer 126, like transformer 100 in FIG. 6, supplies voltage to the corrector winding.

Many other variations and forms of the present device will become apparent after considering this specification and the accompanying drawings. All such devices will have in common two variable reactor devices which are adjusted to vary the current flow through different corrector winding portions and thereby regulate a voltage or maintain a desired voltage.

Thus it is apparent that there has been shown and described various embodiments of a device constructed according to the present invention which fulfills all of the objects and advantages shown therefor. The many changes, alterations and modifications of the present device, which will become apparent to those skilled in the art after considering this specification and the accompanying drawings, and which do not depart from the spirit and scope of the present invention are deemed to be covered by the invention which is limited only by the claims which follow.

What is claimed is:

1. In a supply system having a main primary winding connectable to a power supply source and a main secondary winding connectable to a load, the combination therewith of voltage control means for controlling the voltage supplied to the load within predetermined limits, said control means comprising a pair of circuit terminals coupled in series circuit relation with one of said main windings, a corrector winding inductively coupled to one of said main windings and having two winding sections, a pair of reactors each having one end connected to one of said terminals and another end connected respectively to one end of an associated one of said winding sections, the other ends of said winding sections being connected together and to the other of said circuit terminals, and means for varying the impedances of said reactors to provide a variable voltage between said circuit terminals.

2. Voltage control means for an alternating current supply system having a main winding with opposite end connectors, and a corrector winding with opposite end connectors and an intermediate connector, comprising a pair of reactors each having one end connected together and to one end connector of the main winding, a second end of each of said reactors being connected to different opposite end connectors of the corrector winding, the intermediate connector of said corrector winding and the connected together ends of the reactors being connected in a series circuit with the main winding, and means for varying the impedances of said reactors.

3. A voltage control device for an alternating current supply system having a main winding and a corrector winding coupled thereto comprising a control circuit connected in series with the main winding including a first reactor connected in a first series circuit with a first portion of said corrector winding, a second reactor connected in a second series circuit with a second portion of said corrector winding across said first series circuit, and means associated with each of said reactors for varying the impedance thereof.

4. A voltage control device for a transformer having a main primary winding, a main secondary winding and a corrector winding associated with one of said other main windings comprising a voltage control circuit connected in series with one of said main transformer windings including a first impedance device connected in a first series circuit with a first portion of the corrector winding, a second impedance device connected in a second series circuit with a second portion of the corrector winding across the first series circuit, and means associated with each of said impedance devices for varying the impedance thereof.

5. A voltage control device for a transformer having a main primary winding, a main secondary winding, and a corrector winding associated with one of said other main windings comprising a voltage control circuit connected in series with one of said main transformer windings including a first reactor connected in a first series circuit with a first portion of the corrector winding, a second reactor connected in a second series circuit with a second portion of the corrector winding across the first series circuit, and means associated with each of said reactors for varying the reactance thereof.

6. A voltage control device for an autotransformer having a main winding and a corrector winding coupled thereto comprising a voltage control circuit connected in series with the main winding including a first reactor connected in a first series circuit with a first portion of the corrector winding, a second reactor connected in a second series circuit with a second portion of the corrector winding across the first series circuit, and means for varying the impedance of each of said first and second reactors.

7. Means for controlling the output voltage of an alternating current supply system having a supply source for supplying power to a load comprising an input circuit with an input winding connected across the supply system and an output circuit with an output winding, a control circuit connected to said output winding comprising a first impedance device connected in series with a first portion of said output winding, and the supply source, a second impedance device connected in series with a second portion of said output winding and in parallel circuit relation with said first impedance device and said first portion, and a means for varying the impedances of said first and second impedance devices to regulate the voltage across the load.

8. The control means defined in claim 7 wherein said first and said second impedance devices are reactors.

9. Voltage control means for an alternating current supply system comprising a source of energy connected across a series circuit including a load and a pair of terminals, a transformer having a primary winding connected across the supply system to be energized by the source of energy and a secondary winding having two end connectors and an intermediate connector, said intermediate connector being connected to one of said terminals, and a control circuit connected between the transformer secondary winding and the other of said terminals, said control circuit including a pair of reactors each having a first end connected together and to said other terminal, and each having a second end connected to a different one of said end connectors of the secondary winding, and means for varying the impedance of each of said reactors.

10. Voltage control means for an alternating current supply system comprising a source of energy connected across a series circuit including a load and a secondary winding of a first transformer, a second transformer having one of its windings connected across the supply system to be energized by the source of energy and another of its windings connected to a control circuit including a pair of reactors, one end of each of said reactors being connected together and to one side of a primary winding of the first transformer and another end of each of said reactors being connected to opposite ends of the other winding of said second transformer, an intermediate connector on said other winding of said second transformer, means connecting said intermediate connector to another end of the primary winding of said first transformer, and means for varying the impedances of said reactors.

No references cited.